United States Patent [19]

Pregermain

[11] Patent Number: 4,592,484
[45] Date of Patent: Jun. 3, 1986

[54] SEED-SOWING ELEMENT AND DRILL FOR EXPERIMENTAL PLOTS

[75] Inventor: Jacques Pregermain, Paris, France

[73] Assignees: Institut Technique des Cereales et des Fourrages, Paris; Association Generale des Producteurs de Mais, Pau, both of France

[21] Appl. No.: 628,524

[22] Filed: Jul. 6, 1984

Related U.S. Application Data

[63] Continuation-in-part of Ser. No. 313,135, Oct. 20, 1981, abandoned.

[30] Foreign Application Priority Data

Oct. 29, 1980 [FR] France ................................ 80 23149

[51] Int. Cl.⁴ ............................................. B65G 59/06
[52] U.S. Cl. ....................................... 221/13; 221/211
[58] Field of Search ...................... 221/211, 13; 111/1, 111/34; 222/617, 614

[56] References Cited

FOREIGN PATENT DOCUMENTS 2323308 2/1977 France .
2389316 1/1978 France .

*Primary Examiner*—Stanley H. Tollberg
*Attorney, Agent, or Firm*—Sheridan Neimark; Karl W. Flocks; A. Fred Starobin

[57] ABSTRACT

A seed-sowing element intended to be mounted on a drill of the pneumatic type having a turbine, a general low pressure conduit circuit and a seed-sowing element, with the seed-sowing element comprising a low pressure assembly for recovering excess seeds including a first flap inserted in a low pressure conduit connected to a supply chamber for a disk, a second flap between the outlet of a hopper and the supply chamber, and a third flap positioned in a suction cover adjacent to the disk, the flaps being connected to an operating-cycle control assembly, itself controlled by a datum point set up on the ground and marking the plots to be sown.

5 Claims, 7 Drawing Figures

FIG. 1.
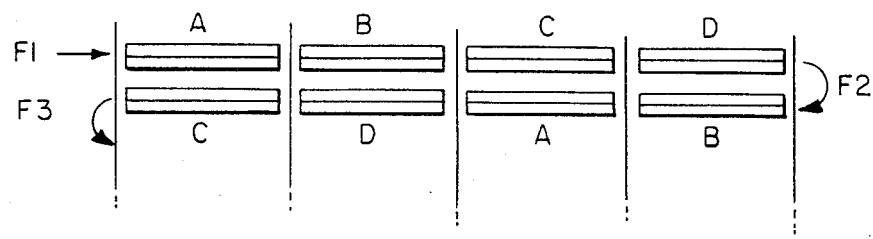
FIG. 2.
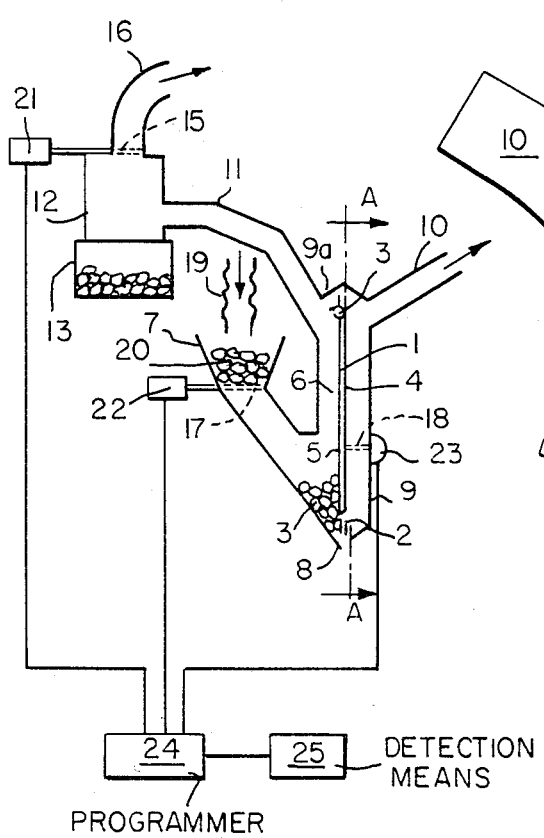
FIG. 3.

SEED-SOWING ELEMENT AND DRILL FOR EXPERIMENTAL PLOTS

BACKGROUND OF THE INVENTION

This case is a continuation-in-part application of Ser. No. 313,135 filed Oct. 20, 1981 abandoned by the present applicant.

The present invention relates to a seed-sowing element for experimental plots, for sowing in small strips, without mixing or deficiency, successively different varieties of seeds, mounted on a drill of the pneumatic type.

It is known that this type of sowing requires, after tracing guidelines on the soil, working in strips or successive plots, having in particular three rows in each, aligned longitudinally and transversely, with backward and forward movement of the drill to the ends of the field. Moreover, each plot is sown with a different variety from that of its immediate neighbors, the required quantity of seeds of each variety, in weight or in number, being previously measured in excess and bagged, a static divider distributing for each row of the same plot the contents of the bag corresponding to the desired variety.

Because of the restrictions imposed on the drill by this type of sowing, it is not possible to use, without modifying them, the usual pneumatic drills which are normally intended for sowing the same variety over a large plot and up to twelve rows. However, drills of this type are known comprising an interchangeable magazine, but they require repeated and time-wasting handling for the small plots considered, to which are added the risks of errors, and they are not very easy to use.

SUMMARY OF THE INVENTION

The present invention aims at remedying these disadvantages by providing a seed-sowing element making the sowing automatic with drills of the pneumatic type providing in particular:

even sowing of the required quantity of seeds of each variety; and instantaneous elimination, at the end of the plot, and without leaving them on the ground, of the excess seeds of each variety, as well as resumption of sowing with the new variety, while leaving a variable generally short empty space.

In accordance with the invention, a seed-sowing element for experimental sowing, of the pneumatic type whose sowing disk has a face opposite a supply chamber connected to a storage hopper, and the other face opposite a suction cover, comprises an assembly, for recovering by means of low pressure excess seeds, connected to the supply chamber and provided with a first flap, a second flap positioned between the outlet and said hopper and the supply chamber, and a third flap positioned in the suction cover so as to cut off at least partially the area to which the low pressure or suction extends therein.

According to another feature of the invention, the above flaps are connected to an operating-cycle control device for ensuring simultaneously the opening of the first flap and closure of the third flap as well as the opening of the second flap, staggered with respect to the proceeding ones, and conversely.

BRIEF DESCRIPTION OF THE DRAWINGS

Other characteristics and advantages of the invention will become clear from the following description given with reference to the accompanying drawings in which:

FIG. 1 shows a diagram of an experimental sowing field divided into small plots for which the drill of the invention is intended;

FIG. 2 shows a schematic view of a seed-sowing element in accordance with the invention, perpendicular to the plane of the sowing disk;

FIG. 3 shows a view of the seed-sowing element viewing the cover to the right of section line A—A of FIG. 2;

In these drawings, the same references designate the same elements.

DESCRIPTION OF THE PREFERRED EMBODIMENTS

Referring to FIG. 1, the experimental sowing of seed varieties, particularly maize, is carried out in successive strips or plots, for example A to D for four varieties and each corresponding to one variety. Each plot comprises, for example, three rows and sowing is carried out from arrow F1, the starting point in a first row, with return after the fourth strip, in the direction of arrow F2, and a further return after the fourth strip of the second row, in the direction of arrow F3, etc. As was mentioned above, the variety is changed for each plot so that each of them is sown with a different variety from that of its immediate neighbors. In the example shown, the first row thus comprises the plots A, B, C, D, whereas the second row comprises the plots, C, D, A, B, the neighboring plots of the columns formed not comprising any identical varieties.

By way of indication, the length of the rows is of the order of 5 to 10 m, the space between the rows being possibly 0.80 m, the space between plots of one row being 0.80 m to 1 m. It will be readily understood that to obtain a field with seedbeds of this type, there is need for an automatic drill which is adapted therefor.

Figure 4:
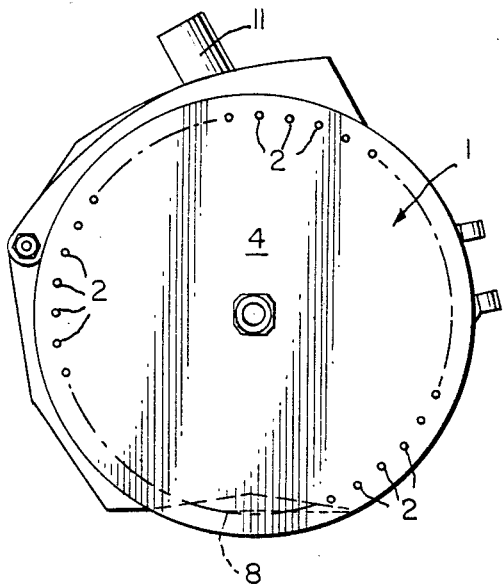
FIG. 4 shows a view of the seed-sowing element looking in the opposite direction, to the left, from the view in FIG. 3, to the left of section line A—A of FIG. 2, with the disk in place.
Figure 5:
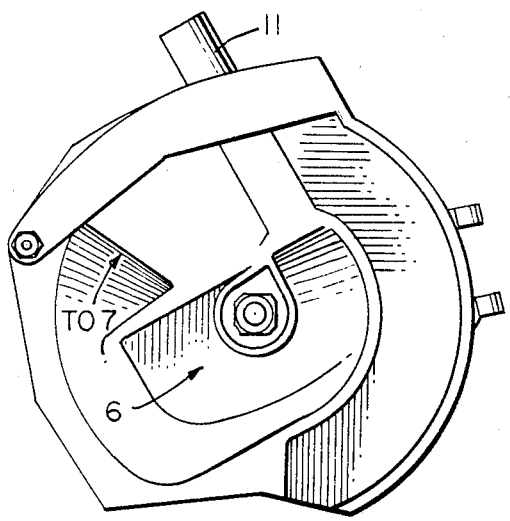
FIG. 5 shows a view similar to FIG. 4 but with the disk removed for clarity.
Figure 6:
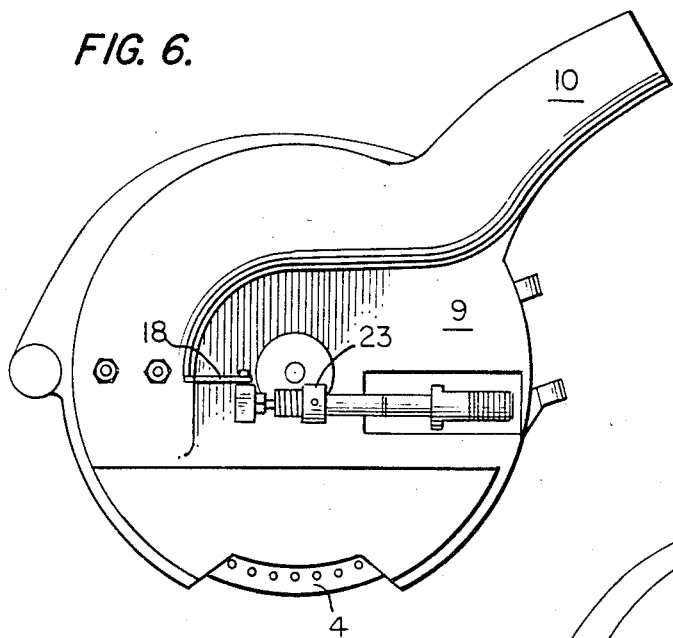
FIG. 6 shows a view from the right side of FIG. 2 with an open flap.
Figure 7:
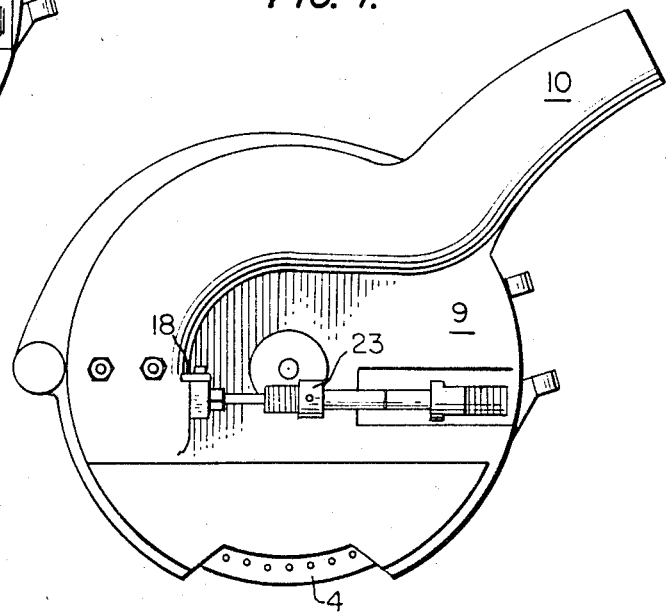
FIG. 7 is a view as in FIG. 6 with the same flap in a closed position.

Referring to FIGS. 1 through 7, it can be seen that a pneumatic drill sowing element comprises essentially a circular thin-wall disk 1 rotating in its vertical plane and having one or more concentric rows of equidistant perforations 2. The diameter of each perforation 2 is always less than the mean diameter of the smallest seeds 3 of the kind to be sown. The rotational movement of the disk is imparted by the carrying wheels of the drill, by means of an appropriate and adjustable transmission. One of the faces 4 of disk 1 is subjected to low pressure or suction over about three-quarters of its surface by the turbine of the apparatus; the other face 5 forms, over a small area one of the vertical walls of the chamber 6 for supplying seeds 3 constantly fed by gravity from a storage hopper 7.

The seeds 3 are stuck, by suction, to each perforation 2 without passing therethrough; an appropriate device allows only one seed to be held on the desired row of perforations. The disk, by rotating, thus carries the seeds over a circular path as far as a zone 8 without suction where they are released and sowed, this zone 8 being disposed straight above the ground. The face 4 of disk 1 is disposed opposite a suction cover 9 connected by a duct 10 to the turbine of the apparatus, which produces the low pressure.

In a way known per se, the suction cover 9 defines a substantially annular groove 9a (FIG. 3) extending along the circle along which the perforations 2 are disposed, with the exception of a zone 8 which is open to the atmosphere and which corresponds to the position where a seed falls to the ground. The majority of the surface of disk 1 is thus subjected to low pressure or suction along groove 9a of the suction cover 9.

In accordance with the invention, supply chamber 6 is of reduced size, depending on the small quantity of seeds to be sown per variety, for example 100 to 130 seeds per row, so as to obtain uninterrupted sowing possibly up to the last three seeds at least, per row of plots.

The assembly for recovering excess seeds by low pressure or suction is connected to supply chamber 6 by means of an extraction duct 11 and comprises a separation wind tunnel 12 into which duct 11 opens. Tunnel 12 is formed by a usual enclosure comprising at its lower part a bowl 13 for recoving the extracted seeds and, at its upper part, a first flap 15 positioned in the low pressure conduit 16 itself connected to the turbine of the apparatus.

The outlet of the storage hopper 7 is provided with a second flap 17 controlling the filling of supply chamber 6, whereas the substantially annular groove 9a of suction cover 9 is provided with a third flap 18 at the level of the supply chamber 6 on the opposite side of disk 1 from chamber 6 and the closing of which cuts off at least partially the extension of the low pressure into duct 9a.

The storage hopper 7 is supplied by means of a duct 19 connected to an appropriate divider delivering the required quantities of each seed variety from a single sample.

The seed-sowing element described above is, of course, mounted on a carrier apparatus, the drill, the speed of rotation of disk 1 being suitably slaved to the speed of advance.

Assuming that chamber 6 is supplied with seeds 3 of variety A and with the turbine running, second flap 17 of the hopper is closed and third flap 18 in suction cover 9 is opened and the sowing operating takes place. A little before the end of the plot, flap 18 is closed, thus preventing disk 1 from being supplied with grains 3 remaining in chamber 6, whereas the grains previously stuck to the perforations 2, still subjected to low pressure or suction, continue their travel towards zone 8, continuing the sowing up to the end of the plot; simultaneously, first flap 15 of wind tunnel 12 is opened which, under the effect of the low pressure in conduit 16, eliminates the excess seeds still present in the bottom of chamber 6 from the chamber 6 and from against face 5 of disk 1. The seeds are then transferred to the recovering bowl 13. During or before the preceding operational phases, hopper 7 has been supplied with seeds 20, for example of variety B. Then the first flap 15 of the wind tunnel 12 is closed and, simultaneously, second flap 17 of the hopper 7 is opened, then third flap 18 of the suction cover. Second flap 17 of the hopper 7 is closed again when the seeds 20 have passed into chamber 6, and the cycle begins again for a new plot.

The above-described operations apply simultaneously to each seed-sowing element, so as to obtain plots having one or more rows, for example three rows, as explained above.

In accordance with the invention, the whole of these operations, which could be carried out manually, is made completely automatic. To this end, the three flaps of each seed-sowing element are each connected to an appropriate control member such as a pneumatic jack, namely 21 for flap 15, 22 for flap 17 and 23 for flap 18. The three jacks are, in their turn, connected to a programmer 24 known per se, for example of the adjustable-cam type actuated by an electric motor or by any mechanical means connected by a coupling to the carry wheels of the apparatus. Programmer 24 ensures, in accordance with a predetermined cycle, the simultaneous and successive operation of the flaps according to the above-described mode. Towards the end of each of the plots, at a given point in the travel path, without stopping the advance of the apparatus, an operator or any other appropriate detection means 25 known per se, for example, electric pulse or contact when passing a datum point set upon the ground, controls the switching on of programmer 24. Of course, the choice of the point for starting the operations, as well as the adjustment of jack 23 depend on the speed of advance, on the space desired between plots and on the crop density, whereas the duration of action of jacks 21 and 22 is previously set to a mean value.

It should, of course, be understood that the present invention has only been described represented by way of explanatory example which is in no wise limiting and that any useful modification may be made thereto, more especially within the scope of technical equivalences, without departing from the scope thereof.

What is claimed is:

1. A seed-sowing element for experimental plots delimited on a piece of ground, mounted on a drill of the pneumatic type having a turbine and a general low pressure suction producing assembly comprising:
    a perforated seed-sowing disk having first and second opposite faces,
    a suction cover connected to a low pressure duct subjecting a majority of the surface of said first face to a low pressure,
    a supply chamber opposite said second face for supplying seeds,
    a duct connected to a storage hopper for supplying the seeds by gravity to said supply chamber,
    an extraction duct connected to said supply chamber,
    an excess-seed low pressure recovery assembly connected to said supply chamber and including
        a first flap inserted in said extraction duct,
        a second flap positioned between an outlet of said storage hopper and said supply chamber,
        and a third flap positioned in said suction cover so as to cut off low pressure from at least part of the surface of said first face,
    said flaps being connected for operation in a cycle.

2. The seed-sowing element as claimed in claim 1, wherein said recovery assembly further includes a wind tunnel having a recovery bowl, connected on the one hand to said supply chamber by said extraction duct and, on the other hand, to the low pressure suction producing assembly connected to the turbine, said first flap being inserted between said wind tunnel and said low pressure suction producing assembly.

3. The seed-sowing element as claimed in claim 1, wherein said storage hopper is connected to a divider for supplying said hopper with successive varieties of seeds depending on the quantities required.

4. The seed-sowing element as claimed in claim 1, wherein said operating cycle control assembly comprises jacks for actuating said respective flaps.

5. The seed-sowing element as claimed in claim 1, wherein said operating-cycle control assembly causes simultaneously opening of said first flap and closing of said third flap, as well as the opening of said second flap staggered with respect to said first flap.

* * * * *